United States Patent [19]

Munakata et al.

[11] Patent Number: 4,817,904
[45] Date of Patent: Apr. 4, 1989

[54] SEAT POSITION ADJUSTING MECHANISM FOR A VEHICLE

[75] Inventors: Kiyohiko Munakata, Yokohama; Shinichi Nishimura, Zama, both of Japan

[73] Assignees: Nissan Motor Company, Limited, Yokohama; Ohi Seisakusho Co., Ltd., Kanagawa, both of Japan

[21] Appl. No.: 460,232

[22] PCT Filed: May 20, 1982

[86] PCT No.: PCT/JP82/00184
§ 371 Date: Jan. 20, 1983
§ 102(e) Date: Jan. 20, 1983

[87] PCT Pub. No.: WO82/04018
PCT Pub. Date: Nov. 25, 1982

[30] Foreign Application Priority Data

May 22, 1981 [JP] Japan .................................. 56-78397

[51] Int. Cl.⁴ ............................................. F16M 13/00
[52] U.S. Cl. ..................................... 248/429; 297/346
[58] Field of Search ............... 248/419, 420, 423, 424, 248/425, 429, 430; 297/317, 322, 346; 267/166, 169, 61 R; 292/165, 170, 173

[56] References Cited

U.S. PATENT DOCUMENTS

| | | | |
|---|---|---|---|
| 1,349,079 | 8/1920 | Markham | 267/61 R |
| 2,134,135 | 10/1938 | Lefevre | 248/423 |
| 3,930,632 | 1/1976 | Shigeta | 297/346 |
| 3,957,312 | 5/1976 | Bonnaud | 248/424 |

FOREIGN PATENT DOCUMENTS

| | | |
|---|---|---|
| 48-27533 | 8/1973 | Japan . |
| 51-93019 | 2/1975 | Japan . |
| 51-39825 | 4/1976 | Japan . |
| 52-47829 | 12/1977 | Japan . |
| 401197 | 11/1933 | United Kingdom ................ 248/430 |

Primary Examiner—J. Franklin Foss
Assistant Examiner—Robert A. Olson
Attorney, Agent, or Firm—Foley & Lardner, Schwartz Jeffery, Schwaab, Mack, Blumenthal & Evans

[57] ABSTRACT

A seat position adjusting mechanism for adjusting a seat position movably in the longitudinal direction of a vehicle comprises a pair of rails (1, 2) which are respectively secured to the floor of the vehicle and the seat. The rail (2) secured to the seat can slide along the rail (1) secured to the vehicle body, and the rail secured to the seat is fixed to the rail secured to the vehicle body in a desired position of seat by means of a latch mechanism (30). The latch mechanism comprises a latch member (3) which engages one of a number of engaging holes (11) formed in the rail secured to the vehicle body and a coil spring (7) which urges the latch member towards the rail secured to the vehicle body. The latch member can be released by an operation handle (5) so that the latch member disengages from the engaging hole (11) to allow the rail secured to the seat to move. For the coil spring, a flattened-cross-section coil spring having a low height-to-width ratio is preferred in order to decrease the required height of the space between the seat and the floor in which the seat position adjusting mechanism is arranged so as to allow the seat installation position to be as low as possible.

13 Claims, 5 Drawing Sheets

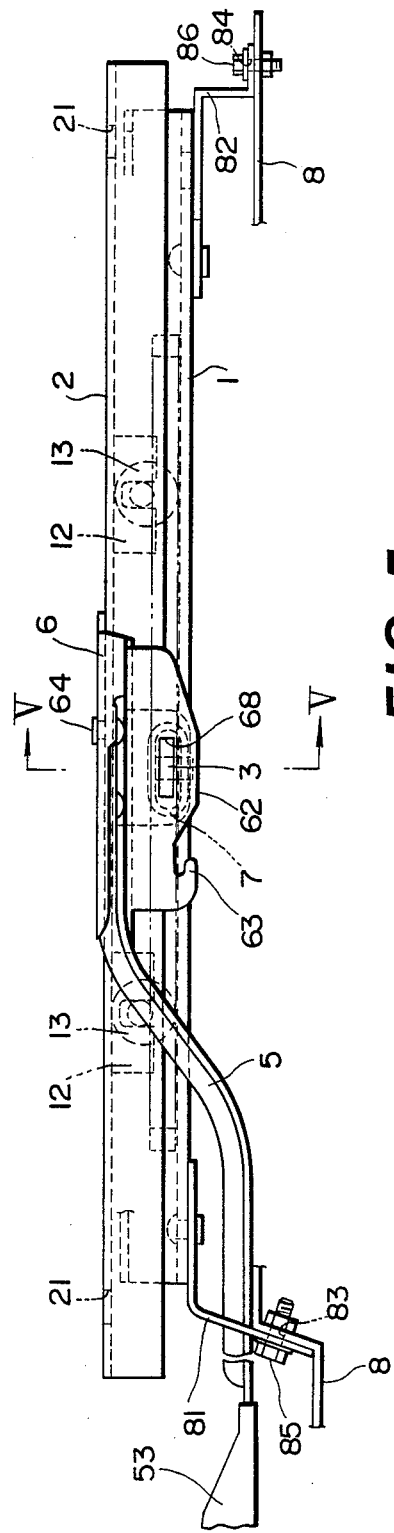
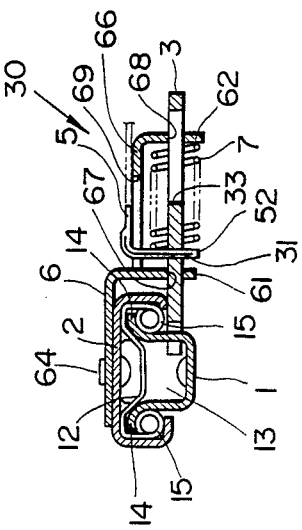
FIG.4
FIG.5

SEAT POSITION ADJUSTING MECHANISM FOR A VEHICLE

FIELD OF THE INVENTION

The present invention relates to a seat position adjusting mechanism for a vehicle, and more particularly to a vehicular seat slide movement mechanism which is formed in a thin shape in order to minimize the space between the seat and a floor panel of the vehicle.

BACKGROUND OF THE INVENTION

As a means of increasing the interior space of the passenger compartment of a vehicle, it is well known to lower the installation position of the seats of the vehicle as much as possible in order to increase head clearance. In order to lower the seat position, it is necessary to decrease the height of the seat with respect to the floor of the vehicle, i.e., the clearance between the seat and the floor should be minimized. However, a seat position adjusting mechanism for moving the seat forwards or backwards and fixing the seat in the desired position must be provided within the clearance between the seat and the floor.

A typical conventional seat position adjusting mechanism for a vehicle comprises a lower rail secured to the vehicle floor, an upper rail secured to the seat and slidably engaging the lower rail, a plurality of position adjusting holes formed in either the lower rail or the upper rail, a latch member on the other rail for engaging the hole, and a coil spring wound around the latch member so that the latch member is urged to engage the hole. Since the coil spring has a cylindrical shape as seen in elevation, the clearance required between the seat and the vehicle floor is limited by the diameter of this coil spring. There are limits to how much the winding diameter of the coil spring and the dimensions of the latch member can be decreased since they are required to hold the seat in the fixed position even against the forces due to collisions. Therefore, it is difficult to decrease the clearance between the seat and the vehicle floor on account of the existance of this seat position adjusting mechanism.

Furthermore, the latch member ordinarily has a laterally wide, rectangular cross-section so that a gap is formed in the vertical direction between the latch member and the coil spring even if the latch member engages with the coil spring in the horizontal direction. This can cause unpleasant frictional noises, buckling, or even failure of the connection between the coil spring and the latch member.

Therefore, it is an object of the present invention to provide a seat position adjusting mechanism for a vehicle which can overcome these drawbacks of the conventional art and be compact-sized so as to allow reduction of the clearance between the seat and the vehicle floor.

SUMMARY OF THE INVENTION

Accordingly, a seat position adjusting mechanism for a vehicle according to the present invention has a coil spring wound around a latch member and formed as a flattened coil spring so as to reduce the unused space between the coil spring and the flat latch member, thereby resulting in a reduction of the overall height of the seat position adjusting mechanism and preventing buckling and unpleasant frictional noises.

The seat position adjusting mechanism for a vehicle according to the present invention comprises a lower rail secured to a vehicle body and one side surface of which is formed with a plurality of engaging holes in the longitudinal direction; an upper rail secured to a seat and slidably engaging the lower rail; a latch member including a flat member having a substantially level surface which is movably supported by the upper rail so as to engage the engaging hole of the lower rail laterally, and a flattened coil spring wound around the flat member so as to urge the flat member in the engaging direction toward the engaging hole; and an operation handle pivotably secured to the upper rail, the top end of which is connected to the latch member and the other end of which is provided with a grip.

In addition, in accordance with a preferred embodiment of the present invention, the latch member and the operation handle are supported by a bracket fixed to the upper rail and this bracket is so designed as to guide the movement of the latch member to the engaging hole.

The flat member of the latch member may be formed with legs in a forked shape at the end facing the engaging holes so that the legs may engage two adjacent holes.

In this manner, according to the present invention, since the coil spring used to urge the latch member has a flat profile, the entire height of the seat position adjusting mechanism can be decreased so that the space for mounting the mechanism needs relatively little clearance. Thus, it is possible to lower the seat installation position. Furthermore, since the mechanism according to the present invention employs a flattened coil spring which has very little tendency to buckle, this will prevent both generation of unpleasant frictional noises due to rubbing between the coil spring and the flat member, and separation of the latch member and coil spring due to friction.

In addition to the above, since the plate-shaped member can be relatively broad due to use of the flattened coil spring, engagement between the latch member and the engaging holes formed in the lower rail can be performed by means of forked legs formed at the top end of the flat member so that the fixing strength of the seat can be increased. Furthermore, each engaging hole can be made to be relatively small so that the pitch between the engaging holes can be also small. As a result, this will provide a good resolution for adjusting the seat position.

BRIEF DESCRIPTION OF THE DRAWINGS

The present invention will be understood more fully from the following detailed description and from the accompanying drawings of the preferred embodiment of the present invention, which however, should not be taken as limitative to the invention but for explanation or elucidation only.

In the drawings;

FIG. 4 is an enlarged elevation view of the seat position adjusting mechanism in FIG. 1;

FIG. 5 is a sectional view taken along the line V—V in FIG. 4;

DESCRIPTION OF THE PREFERRED EMBODIMENT

Figure 1:
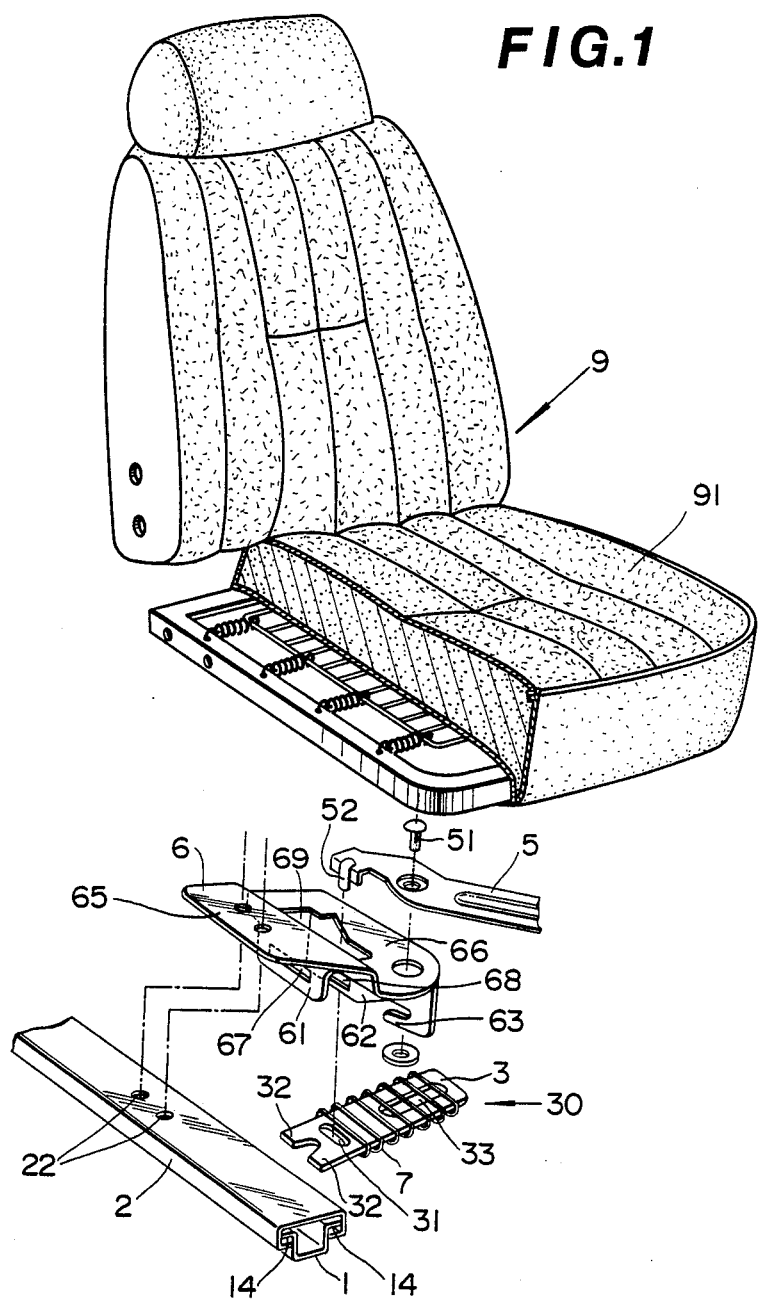
FIG. 1 is a perspective view of a seat position adjusting mechanism according to a preferred embodiment of the present invention.

Hereinbelow, a preferred embodiment of the seat position adjusting mechanism for a vehicle according to the present invention will be explained with reference to the accompanying drawings. FIG. 1 shows a vehicle seat which is equipped with a preferred embodiment of the seat position adjusting mechanism according to the present invention. The seat position adjusting mechanism comprises a lower rail 1 secured to a floor 8 of the vehicle and an upper rail 2 secured to the undersurface of a seat cushion 91 of a seat 9 so as to slidably engage the lower rail 1. The lower rail 1 is provided with fixed brackets 81, 82 at its forward and rear ends so that the rail can be fixed to the floor 8 via fixing bolts 85, 86 respectively inserted through holes 83, 84 formed in the brackets. As shown in FIGS. 2 to 5, the lower rail 1 has a substantially U-shaped cross-section and both edges 14 are bent outwards. Retainers 12 are mounted on the lower rail 1 by means of their rolled ends 15 which engage the rail edges 14. Rollers 13 are secured to the lower rail 1 by the retainers 12.

The upper rail 2 has a substantially C-shaped cross-section and has holes 21, 22. A fixing bolt is inserted through each of the holes 21 in order to fix the upper rail 2 onto the seat cushion 91. On the other hand, in each of the holes 22, a rivet 64 is inserted to fix a bracket 6 of a latch mechanism 30 onto the upper rail 2.

As seen in FIG. 1, bracket 6 includes a mounting portion 65 which lies in a first plane upon the upper surface of the upper rail. Bracket 6 also includes a downwardly extending flange 61, a handle connecting portion 66 extending in the lateral direction form flange 61 in a second plane at a lower elevation with respect to the first plane, and another flange 62 extending downwardly from the handle connection portion 66. Both flanges 61 and 62 have rectangular openings 67 and 68 through which a flat latch number 3 is movably inserted. The handle connecting portion 66 also has a cut-out opening 69 which will allow a handle 5 to rotate relative to bracket 6. It is thus seen that bracket 6 permits handle 5 to be pivoted on a plane which is lower than the first plane.

The latch member 3 is formed at the forward end with legs 32 in a forked shape, and the legs 32 selectably engage two adjacent holes of a range of engaging holes 11 formed along one side wall of the lower rail 1 in the longitudinal direction thereof.

Figure 2:
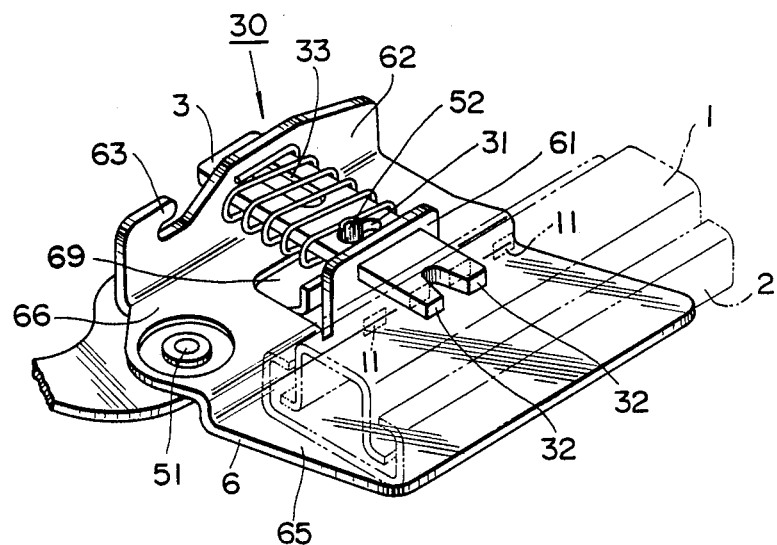
FIG. 2 is an enlarged perspective view of the seat position adjusting mechanism in FIG. 1.

As can be seen from FIG. 5, the longitudinally extending series of holes in the side wall of lower rail 1 through which the forked ends of latch member 3 extend are disposed underneath retainer 12 so as not to interfere with axial movement of the retainer. As shown in FIG. 2, the rear end of the latch member 3 has an elongated opening 33 which engages an operating pawl of a step-in mechanism (not shown), and the center thereof has an opening 31 which engages an actuating pawl 52 of the handle 5. The major axis of the opening 31 is so determined as to match the offset of the actuating pawl 52 due to the rotational motion of the handle 5. In summary, the openings 31 and 33 are designed to facilitate movement of the latch member in the direction perpendicular to the axis of the lower rail 1 in response to actuation of either the handle 5 or the step-in mechanism.

Figure 7:
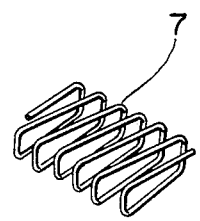
FIG. 7 is perspective view of a flattened coil spring used in the seat position adjusting mechanism in FIG. 1.
Figure 6:
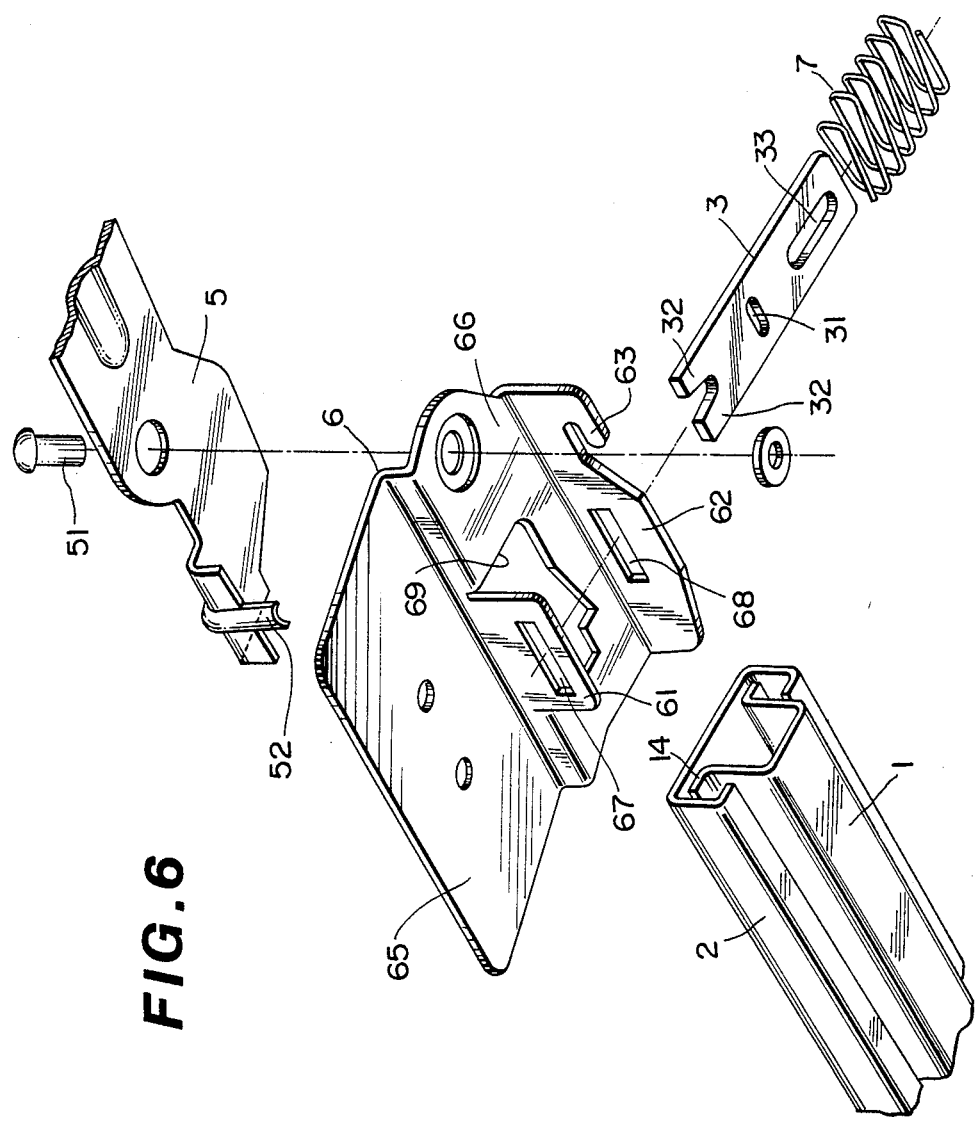
FIG. 6 is an exploded perspective view of the seat position adjusting mechanism in FIG. 2.

A flattened-cross-section coil spring 7 is wound around the latch member 3 within the space between the actuating pawl 52 of the handle 5 and the flange 62. The flattened coil spring 7 is so arranged that one end contacts the actuating pawl 52 and the other end contacts the flange 62 so as to apply its spring force to the actuating pawl 52 and urge it towards the lower rail 1. Accordingly, the latch member 3 is urged in the direction of engagement with the engaging hole 11 of the lower rail 1. The flattened coil spring 7 is contoured substantially parallel to the outer surface of the latch member 3 as shown in FIGS. 6 and 7, and is thinner than an ordinary coil spring.

The handle 5 is so supported by the handleconnecting portion 66 of the bracket 6 as to be rotatable about a pivot 51 and the external end of the handle is formed with a grip 53.

A hook 63 formed in the bracket 6 is adapted to engage one end of a spring (not shown) of the step-in mechanism acting on the seat.

Figure 3:
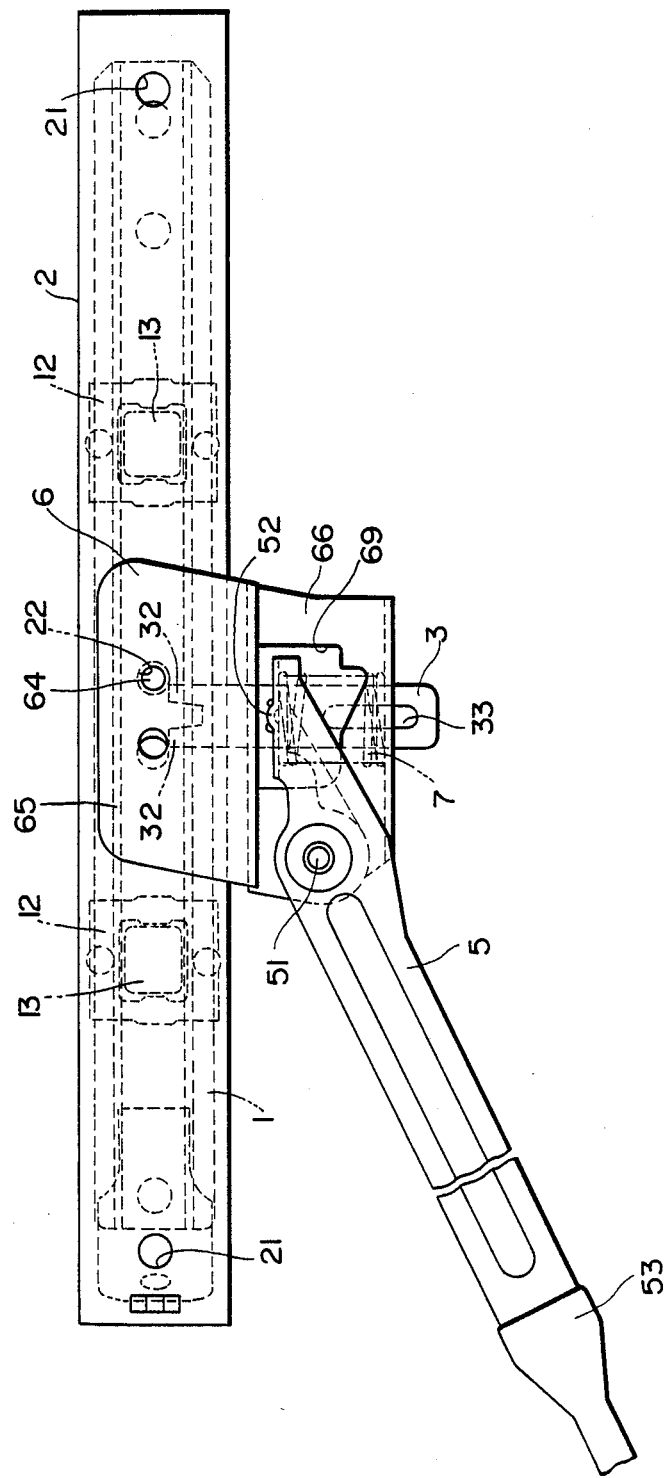
FIG. 3 is an enlarged plan view of the seat position adjusting mechanism in FIG. 1.

Upon adjusting the seat position, the handle 5 is rotated in the clockwise direction in FIG. 3 so that the actuating pawl 52 is moved backward with respect to the lower rail 1. In accordance with this backward movement, the latch member 3 also moves backward so that the legs 32 of the latch member 3 disengage from the engaging holes 11 of the lower rail 1. At this stage, the rectangular openings 67, 68 formed in the flanges 61, 62 of the bracket 6 function as guide members restricting the movement of the latch member 3. In the latch-disengaged condition, the seat 9 can be moved to the desired position by sliding the upper rail 2 along the lower rail 1 via the rollers 13. Then when the handle 5 is released, the actuating pawl 52 advances toward the lower rail 1 due to the return force of the flattened coil spring 7. Thus, the latch member 3 is returned to the engaging position. In this engaging position of the latch member, the forked legs 32 engage two corresponding engaging holes 11 so that the seat 9 is fixed in the desired position.

In this manner, the present invention can accomplish the above-described objects and effects.

In addition, according to the present invention, the seat position adjusting mechanism constructed as described above eliminates the necessity for a buckling-preventing treatment by "closed abrasion" conventionally applied to the coil spring. Since the actuating pawl for actuating the latch member is formed by bending a part of the handle, the manufacture thereof can be simplified.

The invention should not be understood as being limited to the specific embodiment recited hereabove but rather should be understood to include all the possible modifications and other embodiments otherwise embodying the invention without departing from the principle of the invention. For example, the forked legs of the latch member are not always necessary. It is possible to engage the end of the latch member with a single engaging hole when appropriate. In addition, the actuating pawl of the handle may be replaced by a pin set in the handle.

What is claimed is:

1. A seat position adjusting mechanism for a vehicle comprising:
    a lower rail secured to a vehicle body, one side wall of said lower rail being formed with a series of engaging holes along the longitudinal direction of the rail;

an upper rail secured to a seat, said upper rail slidably engaging said lower rail;

a latch mechanism including a flat latch member having a substantially level surface and reciprocally movable about said upper rail toward and away from said lower rail, said flat latch member having a bifurcated end portion opposite said lower rail, said bifurcated end portion constituting latching legs engageable with adjacent engaging holes, and a flattened-cross-section coil spring wound around said latch member so as to urge the latch member in the direction of engagement with said engaging holes; and an operation handle pivotably secured to said upper rail, one end of the handle being connected to said latch mechanism, and the other end of said handle being provided with a grip.

2. A seat position adjusting mechanism for a vehicle comprising:

a lower rail secured to a vehicle body, one side wall of said lower rail being formed with a series of engaging holes along the longitudinal direction of the rail;

an upper rail secured to a seat, said upper rail slidably engaging said lower rail;

a bracket secured to said upper rail, said bracket having a first surface disposed in a first plane facing an upper plane of said upper rail and a second surface disposed in a second plane at a lower elevation relative to said first plane and extending laterally from said first plane;

a latch mechanism mounted on said second surface of said bracket and including a flat latch member supported and guided by said bracket and having a substantially level surface, said latch member being movable so as to engage said engaging holes of said lower rail, and a flattened-cross-section coil spring wound around the latch member so as to bias the latch member in the direction of engagement with said engaging holes; and an operation handle pivotably secured on said second surface of said bracket in such a manner that the upper surface of said handle at the highest lies essentially in alignment with said first plane at the highest at the highest, and associated with said latch member for operating the latch member when it is moved from an engaged position to a disengaged position to release engagement between said latch member and said engaging holes.

3. The mechanism according to claim 2, wherein said predetermined space between the outer surface of said latch member and said flattened coil spring is substantially constant at every point of the outer surface of said latch member.

4. The mechanism according to claim 2, wherein said latch member is provided with a pair of engaging legs (32) at one end, each of which engages with an opposing one of said engaging holes.

5. The mechanism according to claim 2, wherein said bracket (6) includes guide means (67, 68) for guiding the movement of said latch member.

6. The mechanism according to claim 2, wherein said bracket includes guide means (67, 68) for supporting said latch member so as to allow the above mentioned latch member to move linearly and reciprocally, and a supporting means (51) for pivotably supporting said operation handle between said latch engaging and latch-releasing positions.

7. The mechanism according to claim 6, wherein said latch means is connected to said operation handle by way of means (52, 31) which absorb the actuating force thereof in the direction perpendicular to the direction of movement caused by the rotational movement of the operation handle and change the rotational movement into linear movement.

8. A seat position adjusting mechanism for a vehicle comprising:

an upper rail secured to a seat;

a lower rail secured to a vehicle body and engageable with said upper rail through a retainer for allowing axial movement of said upper rail with said retainer, one side wall of said lower rail being formed with a series of engaging holes, said holes being in alignment along a longitudinal axis of said lower rail so as not to interfere with axial movement of said retainer;

a bracket secured to said upper rail, said bracket having a first surface disposed in a first plane facing an upper plane of said upper rail and a second surface disposed in a second plane at a lower elevation relative to said first plane and extending laterally from said first plane;

a latch mechanism mounted on said second surface of said bracket and including a flat latch member supported and guided by said bracket and having a substantially level surface, said latch member being movable so as to engage said engaging holes of said lower rail, and a flattened-cross-section coil spring wound around the latch member so as to bias the latch member in the direction of engagement with said engaging holes; and an operation handle pivotably secured on said second surface of said bracket in such a manner that the upper surface of said handle at the highest lies essentially in alignment with said first plane, and associated with said latch member for operating the latch member when it is moved from an engaged position to a disengaged position to release engagement between said latch member and said engaging holes.

9. A seat position adjusting mechanism for a vehicle comprising:

an upper rail secured to a seat;

a lower rail secured to a vehicle body and engageable with said upper rail through a retainer for allowing axial movement of said upper rail with said retainer, one side wall of said lower rail being formed with a series of engaging holes, said holes being in alignment along a longitudinal axis of said lower rail so as not to interfere with axial movement of said retainer;

a bracket secured to said upper rail, said bracket having a first surface disposed in a first plane facing an upper plane of said upper rail and a second surface disposed in a second plane at a lower elevation relative to said first plane and extending laterally from said first plane;

a latch mechanism mounted on said second surface of said bracket and including a flat latch member supported and guided by said bracket and having a substantially level surface, said latch member being movable so as to engage said engaging holes of said lower rail, and a flattened-cross-section coil spring wound around the latch member so as to bias the latch member in the direction of engagement with said engaging holes; and an operation handle pivotably secured on said second surface of said bracket in such a manner that the upper surface of said handle at the highest lies essentially in alignment with said first plane, and associated with said latch member for operating the latch member through an actuating pawl integrally formed with said handle when said latch member is moved from an engaged position to a disengaged position to release engagement between said latch member and said engaging holes.

10. The mechanism according to claim 9, wherein said latch member is provided with a pair of engaging legs (32) at one end, each of which engages with an opposing one of said engaging holes.

11. The mechanism according to claim 9, wherein said bracket (6) includes guide means (67, 68) for guiding the movement of said latch member.

12. A seat position adjusting mechanism for a vehicle comprising:

an upper rail secured to a seat;

a lower rail secured to a vehicle body and engageable with said upper rail through a retainer for allowing axial movement of said upper rail with said retainer, one side wall of said lower rail being formed with a series of engaging holes, said holes being in alignment along a longitudinal axis of said lower rail so as not to interfere with axial movement of said retainer;

a bracket secured to said upper rail, said bracket having a first surface disposed in a first plane facing an upper plane of said upper rail and a second surface disposed in a second plane at a lower elevation relative to said first plane and extending laterally from said first plane;

a latch mechanism mounted on said second surface of said bracket and including a flat latch member having a bifurcated end portion with latching legs engageable with adjacent engageable holes, being supported and guided by said bracket, and a flattened-cross-section coil spring disposed about the latch member so as to bias the latch member in the direction of engagement for said engaging holes; and an operation handle pivotably secured on said second surface of said bracket in such a manner that the upper surface of said handle lies in a plane which is lower than said first plane, and associated with said latch member for moving the latch member through an actuating pawl integrally formed with said handle when it is moved from an engaged position to a disengaged position to release engagement between said latch member and said engaging holes.

13. A mechanism according to claim 12 wherein said retainer comprises at least one roller disposed between the upper and lower rails to permit relative movement between the upper and lower rails along their longitudinal axis.

* * * * *